July 19, 1949.  J. B. VAN DER WERFF  2,476,519
FOUR-WAY VALVE
Filed Dec. 4, 1944   3 Sheets-Sheet 1
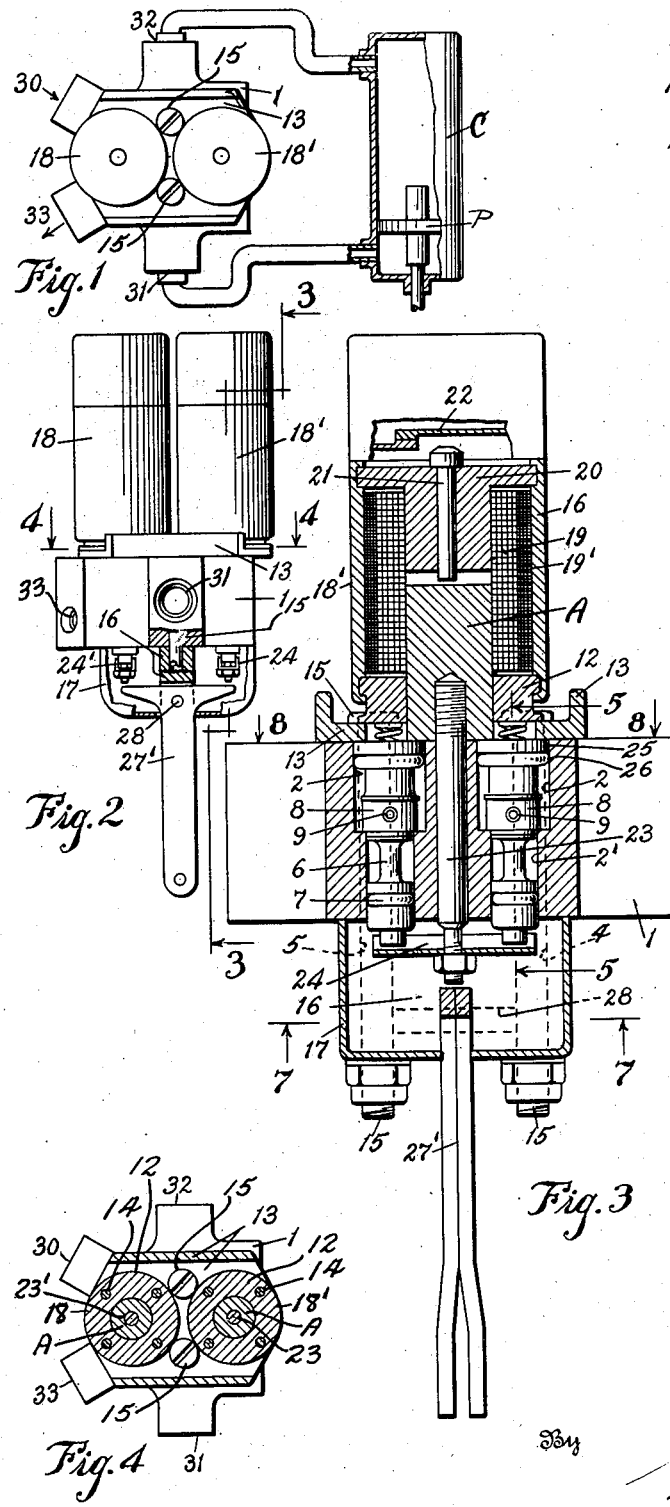
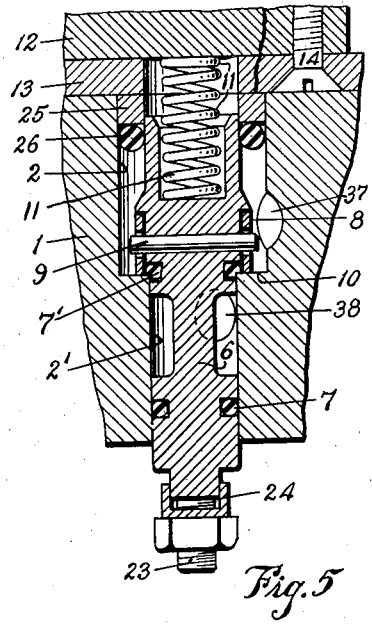
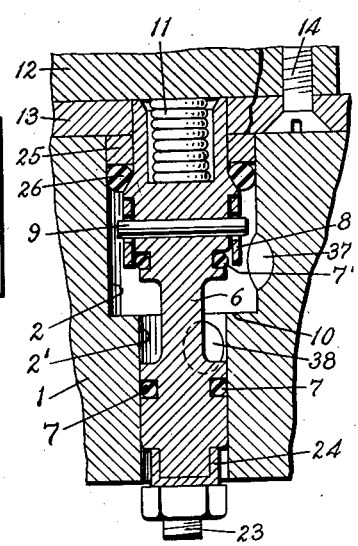
Inventor
Jacob B. Van Der Werff July 19, 1949.  J. B. VAN DER WERFF  2,476,519
FOUR-WAY VALVE Filed Dec. 4, 1944  3 Sheets-Sheet 2

Inventor
Jacob B. Van Der Werff

By R. S. Berry

Attorney

July 19, 1949.  J. B. VAN DER WERFF  2,476,519
FOUR-WAY VALVE

Filed Dec. 4, 1944  3 Sheets-Sheet 3

Inventor
Jacob B. Van Der Werff
By R. S. Burris
Attorney

Patented July 19, 1949

2,476,519

UNITED STATES PATENT OFFICE 2,476,519

FOUR-WAY VALVE

Jacob B. Van Der Werff, Pasadena, Calif., assignor to Adel Precision Products Corp., a corporation of California Application December 4, 1944, Serial No. 566,522

4 Claims. (Cl. 137—144)

1

This invention relates to 4-way valves of the type which are electrically operated, with provision for manual operation in case of emergency, and it has among its salient objects to provide a 4-way, or flow-reversing, valve which is capable of use with a compressed air system, or with a hydraulic system; to provide such a valve mechanism which is efficiently practical and quick in its operation; to provide in such a valve mechanism a body having therein two pairs of parallel valve-receiving bores or chambers with connecting ports or passageways, whereby said valves can be operated in pairs for accomplishing the quick action of an operating piston and whatever may be connected therewith; and, in general, to provide a simple, practical and efficient four-way valve mechanism of the character referred to.

On the accompanying three sheets of drawings, I have shown one practical embodiment of the invention which I will now describe:

Fig. 1 is a top plan view of a four-way valve structure, with an operating cylinder connected therewith;

Fig. 2 is a side elevation thereof with a part broken away;

Fig. 3 is an enlarged vertical sectional view taken on the line 3—3 of Fig. 2;

Fig. 4 is a horizontal sectional view taken on the line 4—4 of Fig. 2;

Figs. 5 and 6 are fragmentary sectional views of the valve member in closed and open positions, respectively both taken on line 5—5 of Fig. 3;

Figure 9:
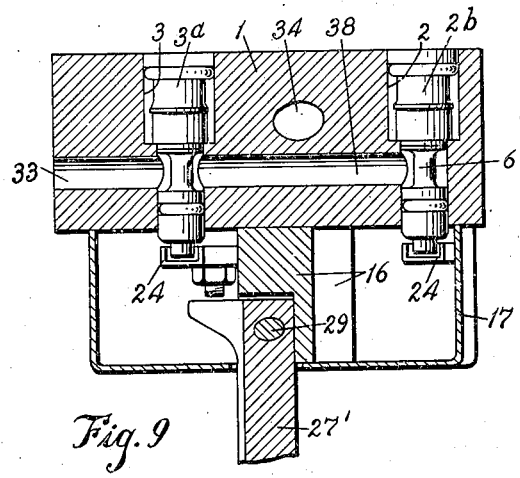
Figure 10:
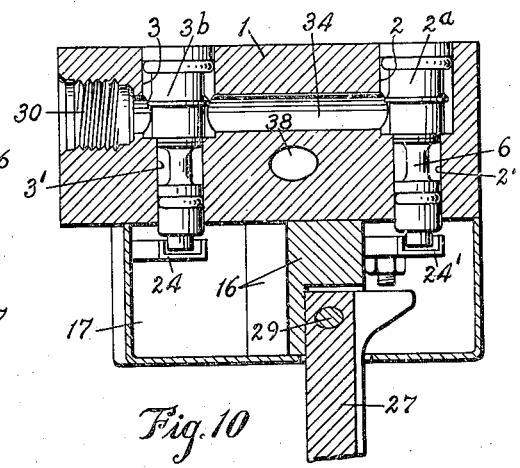

Figs. 9, 10, 11 and 12 are sectional views taken, respectively, on lines 9—9, 10—10, 11—11 and 12—12 on Fig. 9, showing the valve bores and the connecting ports or passageways.

Figure 7:
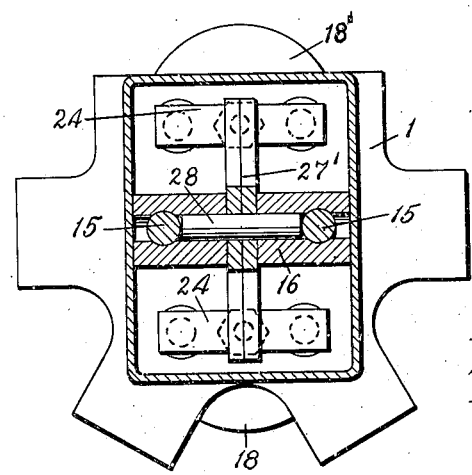
Fig. 7 is a bottom plan view, on line 7—7 of Fig. 3, partly in section.
Figure 8:
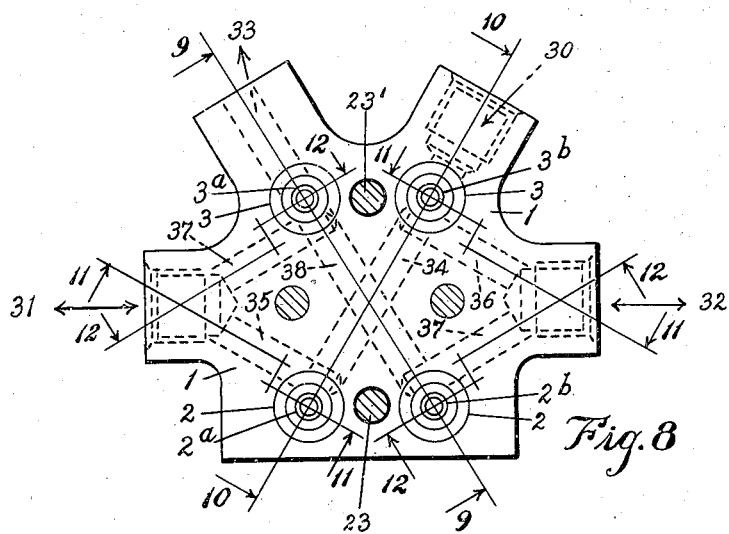
Fig. 8 is a top plan view of the body, on line 8—8 of Fig. 3, with parts in section.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Referring in detail to the drawings, the valve body is shown in Figs. 1, 7 and 8, and its relative thickness will be understood from Figs. 2, 3, 5 and 7, said body being designated 1 in all places.

The valve body is provided with a pair of valve chamber bores 2, 2 extending from the top face thereof of the valve body and with a second pair of valve chamber bores 3, 3 which extend parallel

2 to each other and to the bores 2, 2. Continuing from the bottom of the bores 2, 2, and 3, 3, to the opposite face of the valve body are smaller concentric valve guiding bores 2', 2' and 3', 3'. Additionally, the valve body is provided with a pair of holes 4 and 5 extending parallel to the valve bores for reception of a pair of bolts 15, 15 which serve to hold the entire assembly together as will be hereinafter described. Mounted in each of the bores 2', 2' and 3', 3' and extending into the associated valve chambers is a valve assembly comprising a valve member including a stem 6 having at one end a grooved guiding portion carrying a sealing ring 7 engaging the walls of the guiding bores and carrying a second sealing ring 7' engageable with a valve seat 10 formed by the juncture of the guiding bore with its associated valve chamber bore. The valve member is further provided with a sleeve member 8 loosely secured thereon by a cross pin 9 which sleeve extends partly across the outer face of the sealing ring 7' and is adapted to engage the bottom of the valve chamber bore when the valve is closed and when thus engaged to limit the movement of the valve by engagement of its opposite end face with a shoulder on the valve member. The upper end of the valve member is provided with a cylindrical recess in which a compression spring 11 is housed. The opposite end of the spring bears against a base member 12 of a solenoid assembly later to be more specifically described. These valve members in construction and mode of operation are generally of the character disclosed in my co-pending application, Serial No. 533,589, filed May 1, 1944, now Patent Number 2,431,437, granted November 25, 1947) and further description is not thought necessary. The base member 12 is secured to a cover plate 13 by a series of screws 14 and bolts 15, 15 passing through the bores 4 and 5 secure the cover plate to the body member 1, and additionally secure a block 16 and a cover 17 to the under face of the valve body member.

As here shown there are two solenoids employed, the solenoid 18 is arranged for actuation of the valves in the valve chamber bores 3, 3 and the valves in the valve chamber bores 2, 2 are actuated by the solenoid 18'.

In general the solenoids are like that disclosed in the application of Orrin Robert Broberg, Serial No. 493,667, filed July 6, 1943, now abandoned, and comprise an outer casing 16 having one end spun into a groove in the base member 12 and enclosing a coil construction including a heavy coil 19 and a holding coil 19'. The upper end of the casing is spun or crimped over the head member 20 whereof a central portion extends down inside the coils and affords guidance for a plunger pin 21 adapted, upon energization of the coils, to be engaged by the armature A and to be caused to open a switch 22 cutting out the heavy coil 19 while retaining the holding coil 19' energized.

The armatures A of the solenoid 18 and 18' are provided respectively with rods 23' and 23 slidably mounted in bores extending through the valve body which rods at their lower ends carry transversely disposed channel members 24 which extend beneath the projecting ends of the valve members. It will be seen that upon energization of the solenoid 18, the valves in the valve chamber bores 3, 3 will be unseated and that the solenoid 18' will likewise independently unseat the valves in the valve chamber bores 2, 2.

Each valve member at its upper end is surrounded by a spacing ring 25 and within the valve chamber bore and contacting the inner face of the ring 25 and the adjacent walls of the bore and the valve member is a resilient sealing ring 26. Engagement with the cover plate 13 serves to hold the spacing rings 25 in place.

Pivotally mounted on a pin 26 carried by the block 16, which pin is held against endwise movement by engagement with the bolts 15, 15, is a T-shaped hand lever 27' whereof the ends of the T extend below the ends of the rods 23 and 23'. Upon oscillation of the lever 27' one or the other pair of valves will be unseated.

Attention is called to the fact that said valve bores, or chambers, 2, 3 and 3,3, are connected by ports or passageways, as indicated in broken lines, Fig. 8. When said valve members are in their closed positions, they rest on the shoulders 10 formed between the upper larger portions 2, 2, and 3, 3 and the smaller portions 2', 2' and 3', 3', Fig. 5. There is a passageway around the closed valve member through the upper larger portions of said valve chambers, to other valve ports, or chambers, and when said valve members are raised, as seen in Fig. 6, said upper larger valve chambers 2, 2, and 3, 3, are in open communication with the lower smaller portions 2', 2' and 3', 3', and also with connecting ports or passageways, as shown in Figs. 9 to 12 inclusive.

Figure 11:
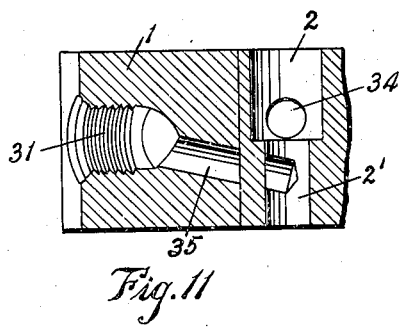
Figure 12:
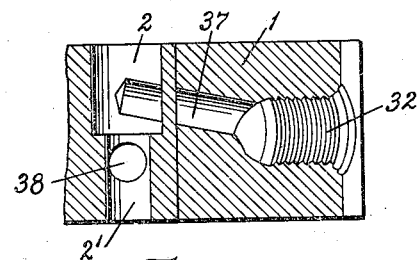

Referring now to Fig. 8, the inlet port for the supply of operating fluid, whether air or liquid, is designated by the small arrow 30, while the ports for connection with the opposite ends of an operating cylinder C, as seen in Fig. 1, are designated by the arrows 31 and 32, and the exhaust or return port is designated by the arrow 33, shown as open to the atmosphere in said Fig. 8, while the other ports are internally threaded for connecting means as seen in section in Figs. 1, 11 and 12.

If the valve is to be used in a hydraulic system, then this port 33 would be internally threaded, as are the other ports 30, 31 and 32. I have shown the mechanism as it would be used with air under pressure.

Assuming now that a source of supply of air under pressure is connected with the port 30, Fig. 8, and it is desired to direct it into the left end of an operating cylinder, connected with port 31, or to the right end of said operating cylinder, connected with port 32, I will now describe the construction which makes this possible.

For convenience of reference to the valve members in said Fig. 8, I have designated the valve members in the valve bores 2, 2, as 2ª and 2ᵇ, and the valve members in the valve bores 3, 3, as 3ª and 3ᵇ.

It will be understood, of course, that the valves in this mechanism are electrically controlled and that by the manipulation of suitable switches either of the solenoids can be energized for moving the valve members in pairs for controlling and reversing the flow of the air under pressure.

Referring to Figs. 1 and 8, if it is desired to direct the supply of air (or liquid) under pressure connected with port 30, to a cylinder for operating some mechanism, the proper solenoid will be energized to open valves 2ª and 2ᵇ together, as before described, whereupon the operating fluid will flow through valve chamber 3, around closed valve 3ᵇ, through passageway 34, to and through valve chamber 2 (valve 2ª would be open), to the smaller portion 2' thereof, and thence through passageway 35 (seen in Fig. 11), to port 31, and thence to the cylinder C, as indicated in Fig. 1, for moving the piston P, and its connections. Fluid from the opposite end of said cylinder will pass to and through port 32, passageway 37, to and through open valve 2ᵇ and out through passageway 38, around closed valve 3ª, and out through passageway 33 to the atmosphere, if air, or to a storage reservoir, if liquid.

If now it is desired to reverse the operation of the piston in cylinder C, the solenoid for opening valves 3ª and 3ᵇ is energized, whereupon the operating fluid from said connected port 30 will be directed through open valve 3ᵇ, through passageway 36 to port 32 and to the opposite end of said cylinder, whereupon said piston will be moved in the opposite direction. Fluid from the opposite end of said cylinder will be directed back to port 31, passageway 37, through open valve 3ª and thence to the outlet or return passageway 33. This operation is best traced on Fig. 8, and by reference to the several sectional views in Figs. 9, 10, 11, and 12, it is believed to be clear. Figs. 5 and 6 show the closed valve and the open valve, and the connecting passageways which are indicated in broken lines in said Fig. 8.

Thus I have provided a 4-way valve mechanism in which two different pairs of valve members are moved together in the control of operating fluid through the valve body, to and from a place of use, also a valve mechanism in which the valve chambers are of two different diameters each, with the passageways in the body of the valve being between the larger portions of valve chambers and between the smaller portions of said valve chambers, thus making it possible to control a maximum of flow passageways through a valve body by valve members connected and operated in pairs.

I do not limit my invention to the details of construction and arrangement as shown for explanatory purposes, except as I may be limited by a broad interpretation or construction of the hereto appended claims.

I claim:

1. In a four-way valve of the character referred to, a body having therein two pairs of valve chambers, a spring loaded normally closed valve member in each of said chambers, a solenoid and means connected with the solenoid for moving one pair of said valve members to open positions, a second solenoid and means connected therewith for moving the other pair of said valve members to open position, said body being provided with passageways therein for connecting said four valve chambers with inlet and outlet ports to and from said body and with each other, and also with ports for conducting an operating fluid from said body to and from a place of use, said valve members being operable by said solenoids for controlling the flow of said operating fluid.

2. A four-way valve mechanism including a valve body having therein two pairs of valve chambers, a spring-loaded normally closed valve in each chamber, a pair of solenoids for moving said valves, said solenoids each having means engageable with the end of said valves remote from said solenoid and adapted to move one pair of valve members simultaneously to open position, said body having passageways therein connecting said four valve chambers with each other and with connecting ports in said body, and four connecting ports in said body for conducting operating fluid from said body to and from a place of use and for conducting a main supply of operating fluid into said body and for its release after use, whereby operating fluid can be directed to a place of use and returned therefrom by the alternate operation of said valves in pairs by said solenoids.

3. A four-way valve mechanism including a valve body having therein two pairs of valve chambers, a spring-loaded valve member in each chamber, a pair of solenoids for moving said valve members, said solenoids having means including armatures for moving said pairs in the same direction as said armatures are moved, said valve body having passageways therein connecting said valve chambers with each other at different levels and also with connecting ports in said body, and four connecting ports in said body for conducting operating fluid from said body to and from a place of use and for conducting a main supply of operating fluid into said body and for its release after use, whereby operating fluid can be directed to a place of use and returned therefrom by the alternate operation of said valve members in pairs by said solenoids.

4. A four-way valve mechanism including a body having therein two pairs of valve chambers, said valve chambers each having an upper and a lower portion of cylindrical form and of different diameters, a normally closed valve member in each of said valve chambers, each of said valve members being of two different diameters and adapted to open communication between the upper portions of said valve chambers and the lower portions thereof, and to close communication between said upper and lower portions, solenoids connected with said valve members for moving the same in pairs, said body having passageways therein connecting said valve chambers between their upper larger portions, and between their lower smaller portions, and four connecting ports in said body for conducting operating fluid from said body to and from a place of use, and for conducting a main supply of operating fluid into said body, and for its release after use, whereby operating fluid can be directed to a place of use, and returned therefrom by the operation of said valve members by said solenoids.

JACOB B. VAN DER WERFF.

REFERENCES CITED

The following references are of record in the file of this patent:

UNITED STATES PATENTS

| Number | Name | Date |
|---|---|---|
| Re. 7,048 | Frink | Apr. 11, 1876 |
| 665,704 | Strong | Jan. 8, 1901 |
| 817,773 | Hennebohle | Apr. 17, 1906 |
| 993,742 | Wardlaw | May 30, 1911 |
| 1,157,196 | VonPhilp | Oct. 19, 1915 |
| 1,486,303 | Ross | Mar. 11, 1924 |
| 1,772,920 | Hynes | July 30, 1929 |
| 1,956,775 | Ross | May 1, 1934 |
| 2,339,353 | Ray | Jan. 18, 1944 |